(12) United States Patent
Seddeek et al.

(10) Patent No.: US 11,922,380 B2
(45) Date of Patent: Mar. 5, 2024

(54) SYSTEM AND METHOD FOR RECOMMENDING PORTABLE FINANCIAL DEVICE FOR A PAYMENT TRANSACTION

(71) Applicant: YamaPay Inc., Stockton, CA (US)

(72) Inventors: Ashraf Seddeek, Stockton, CA (US); Vipul Jain, Bangalore (IN)

(73) Assignee: YamaPay Inc., Stockton, CA (US)

( * ) Notice: Subject to any disclaimer, the term of this patent is extended or adjusted under 35 U.S.C. 154(b) by 151 days.

(21) Appl. No.: 17/409,365

(22) Filed: Aug. 23, 2021

(65) Prior Publication Data

US 2023/0056297 A1 Feb. 23, 2023

(51) Int. Cl.
*G06Q 20/06* (2012.01)
*G06Q 20/08* (2012.01)
*G06Q 20/22* (2012.01)
*G06Q 30/0226* (2023.01)

(52) U.S. Cl.
CPC ....... *G06Q 20/065* (2013.01); *G06Q 20/0855* (2013.01); *G06Q 20/227* (2013.01); *G06Q 30/0226* (2013.01)

(58) Field of Classification Search
None
See application file for complete search history.

(56) References Cited

U.S. PATENT DOCUMENTS

| 10,719,826 B2* | 7/2020 | Kim | G06Q 20/36 |
| 10,997,592 B1 | 5/2021 | Kurani | |
| 2010/0262537 A1 | 10/2010 | Park | |
| 2015/0058105 A1* | 2/2015 | Fonseca | G06Q 30/0226 705/14.17 |
| 2019/0114611 A1 | 4/2019 | Tripathi et al. | |
| 2021/0027357 A1* | 1/2021 | Bonfigli | G06Q 30/0224 |
| 2021/0049638 A1 | 2/2021 | Behravesh | |
| 2021/0192496 A1* | 6/2021 | Gregovic | G06N 20/20 |

FOREIGN PATENT DOCUMENTS

WO WO-2014209677 A2 * 12/2014 ............. G06Q 20/10

* cited by examiner

*Primary Examiner* — Paul S Schwarzenberg
(74) *Attorney, Agent, or Firm* — Jason C. Cameron

(57) ABSTRACT

A system and method for recommending portable financial device for a payment transaction is disclosed. The method includes establishing a secure communication session with one or more external APIs during a payment transaction stage and fetching data representative of banking accounts associated with a customer from the one or more external APIs. The method further includes determining one or more transactional parameters associated with the payment transaction stage and generating an optimal score for each of the one or more portable financial devices by using Machine Learning (ML) based transaction model. The method includes identifying best suitable portable financial device with maximum optimal score and recommending the identified best suitable portable financial device for completing the payment transaction stage based on the identification. Further, the method includes outputting the recommended portable financial device on a graphical user interface of one or more electronic devices associated with the customer.

10 Claims, 8 Drawing Sheets

SYSTEM AND METHOD FOR RECOMMENDING PORTABLE FINANCIAL DEVICE FOR A PAYMENT TRANSACTION

FIELD OF INVENTION

Embodiments of the present disclosure relate to a payment transaction system and more particularly relates to a system and a method for recommending a portable financial device for a payment transaction.

BACKGROUND

With the advancements in technology, customers often use portable financial devices such as debit cards and credit cards for payment of products and services. A single customer may have multiple portable financial devices. Each portable financial device has different reward programs to provide one or more reward benefits to the customer, such as cashback, discount and reward points, upon using the portable financial device for a payment transaction. The array of one or more reward programs associated with each portable financial device makes it difficult for the customer to decide which portable financial device is beneficial for a given payment transaction in order to gain maximum reward benefits. Conventionally available systems use geolocation information to recommend the portable financial device for a payment transaction. However, the conventional systems lack accuracy as it is very difficult to detect exact geolocation of the customer. Further, while using the conventional systems, the customer is required to use the portable financial device for the payment transaction. Thus, the customer is required to always carry the portable financial devices with him. Furthermore, the conventional systems also fail to consider real-time data associated with the portable financial devices while recommending the portable financial device to the customer. Therefore, the conventional systems are not reliable.

Hence, there is a need for a system and method for recommending a portable financial device for a payment transaction in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for recommending a portable financial device for a payment transaction is disclosed. The computing system includes one or more hardware processors and a memory coupled to the one or more hardware processors. The memory includes a plurality of modules in the form of programmable instructions executable by the one or more hardware processors. The plurality of modules include a communication module configured to establish a secure communication session with one or more external Application Programming Interfaces (APIs) during a payment transaction stage at a merchant's website. The plurality of modules also include a data fetching module configured to fetch data representative of banking accounts associated with a customer from the one or more external APIs after establishing the secure communication session. Each banking account includes one or more portable financial devices. The data representative of banking accounts associated with the customer include real-time account balance information, past transaction records of the customer and monetary details of the one or more portable financial devices. The plurality of modules further include a parameter determination and device identification module configured to determine one or more transactional parameters associated with the payment transaction stage at the merchant's website in real-time based on third-party website. The one or more transactional parameters include Personal Identifiable Information (PII) of one or more merchants including Merchant Category Codes (MCC) and Merchant Identification Number (MID) of the one or more merchants, reward programs associated with the one or more portable financial devices of the customer and one or more banking account conditions. Also, the parameter determination and device identification module is configured to generate an optimal score for each of the one or more portable financial devices based on the fetched data representative of banking accounts associated with the customer and the determined one or more transactional parameters by using Machine Learning (ML) based transaction model. Further, the parameter determination and device identification module is configured to identify best suitable portable financial device among the one or more portable financial devices with maximum optimal score. Furthermore, the plurality of modules include a device recommendation module configured to recommend the identified best suitable portable financial device for completing the payment transaction stage at the merchant's website based on the identification. Also, the plurality of modules include data output module configured to output the recommended portable financial device on a graphical user interface of one or more electronic devices associated with the customer.

In accordance with another embodiment of the present disclosure, a method for recommending a portable financial device for a payment transaction is disclosed. The method includes establishing a secure communication session with one or more external Application Programming Interfaces (APIs) during a payment transaction stage at a merchant's website. The method also includes fetching data representative of banking accounts associated with a customer from the one or more external APIs after establishing the secure communication session. Each banking account includes one or more portable financial devices. The data representative of banking accounts associated with the customer include real-time account balance information, past transaction records of the customer and monetary details of the one or more portable financial devices. The method further includes determining one or more transactional parameters associated with the payment transaction stage at the merchant's website in real-time based on third-party website. The one or more transactional parameters include Personal Identifiable Information (PII) of one or more merchants including Merchant Category Codes (MCC) and Merchant Identification Number (MID) of the one or more merchants, reward programs associated with the one or more portable financial devices of the customer and one or more banking account conditions. Further, the method includes generating an optimal score for each of the one or more portable financial devices based on the fetched data representative of banking accounts associated with the customer and the determined one or more transactional parameters by using Machine Learning (ML) based transaction model. Also, the method includes identifying best suitable portable financial device among the one or more portable financial devices with maximum optimal score. Furthermore, the method includes recommending the identified best suitable portable financial device for completing the payment transaction stage at the merchant's website based on the identification. The method also includes outputting the recommended portable financial device on a graphical user interface of one or more electronic devices associated with the customer.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
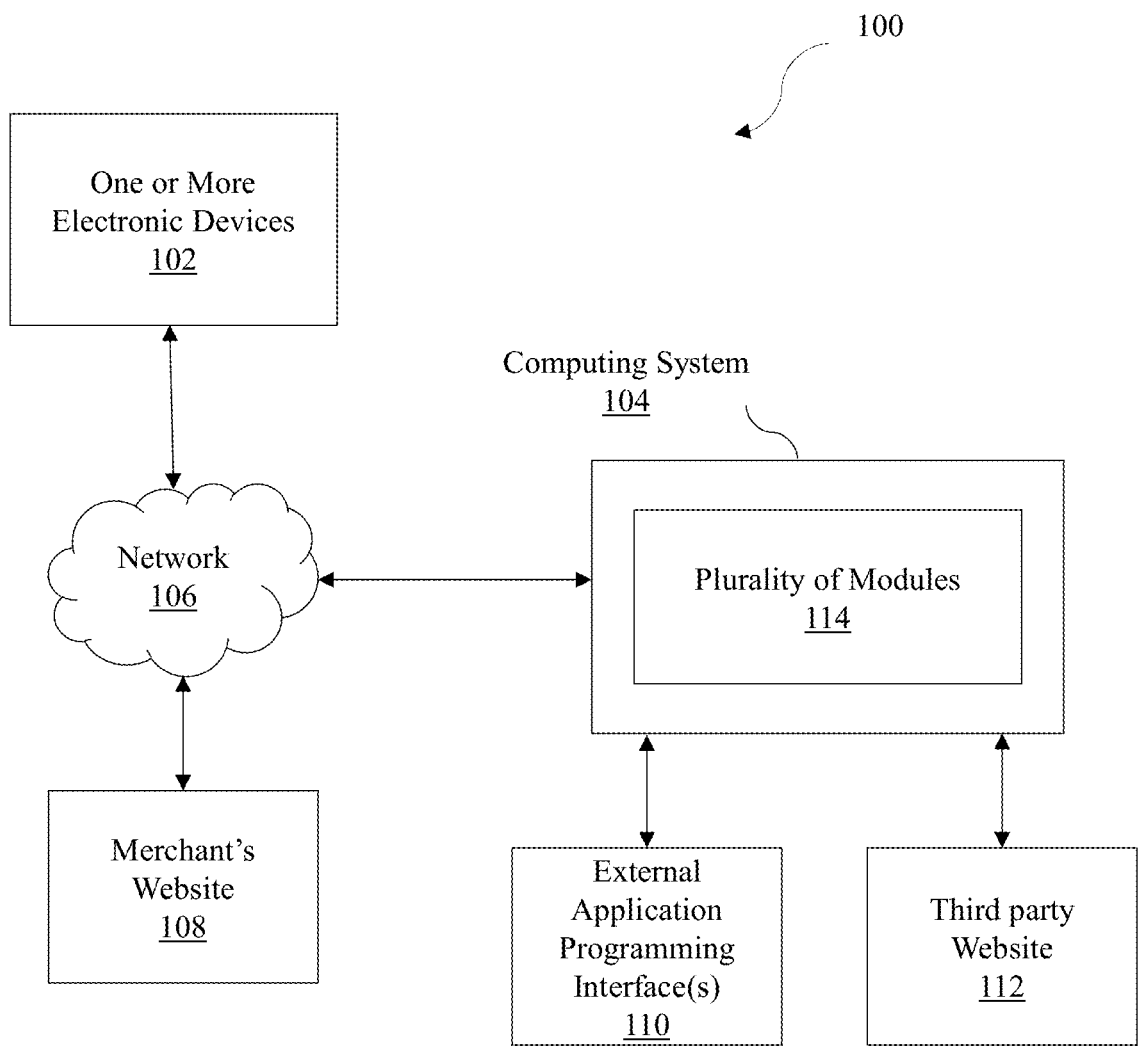
FIG. 1 is a block diagram illustrating an exemplary computing environment capable of recommending a portable financial device for a payment transaction, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Although the explanation is limited to a single customer and merchant, it should be understood by the person skilled in the art that the computing system is applied if there are more than one patient and merchant.

Referring now to the drawings, and more particularly to FIG. 1 through FIG. 4A-B, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 capable of recommending a portable financial device for a payment transaction, in accordance with an embodiment of the present disclosure. According to FIG. 1, the computing environment 100 includes one or more electronic devices 102 associated with a customer communicatively coupled to a computing system 104 via a network 106. In an exemplary embodiment of the present disclosure, the one or more electronic devices 102 may be a laptop computer, desktop computer, tablet computer, smartphone, wearable device, smart watch and the like. In an exemplary embodiment of the present disclosure, the network 106 may be internet. The computing system 104 may be a central server, such as cloud server or a remote server. Further, the one or more electronic devices 102 include a web browser and a mobile application to access the computing system 104 via the network 106. In an embodiment of the present disclosure, the customer may use a web application through the web browser to access the computing system 104. Furthermore, the computing system 104 is communicatively coupled with a merchant's website 108 via the network 106. The customer may use the computing system 104 to perform a payment transaction at the merchant's website 108.

Further, the computing environment 100 also includes one or more external Application Programming Interfaces (APIs) 110 and a third-party website 112 communicatively coupled to the computing system 104. The one or more external APIs 110 stores data representative of banking accounts associated with the customer. Furthermore, a third-party database associated with the third-party website 112 stores one or more transactional parameters associated with the payment transaction. The computing system 104 includes a plurality of modules 114. Details on the plurality of modules 114 have been elaborated in subsequent paragraphs of the present description with reference to FIG. 2.

In an embodiment, the computing system 104 is configured to establish a secure communication session with the one or more external APIs 110 during a payment transaction stage at the merchant's website 108. In an embodiment of the present disclosure, data exchanged between the computing system 104 and the one or more external APIs 110 after establishing the secure communication session may be encrypted to enhance data security. Further, the computing system 104 also fetches data representative of banking accounts associated with the customer from the one or more external APIs 110 after establishing the secure communication session. In an exemplary embodiment of the present disclosure, the computing system 104 may fetch data representative of banking accounts associated with the customer from external vendor. The computing system 104 determines the one or more transactional parameters associated with the payment transaction stage at the merchant's website 108 in real-time based on third-party website 112. Furthermore, the computing system 104 generates an optimal score for each of the one or more portable financial devices based on the fetched data representative of banking accounts associated with the customer and the determined one or more transactional parameters by using Machine Learning (ML) based transaction model. The computing system 104 identifies best suitable portable financial device among the one or more portable financial devices with maximum optimal score. The computing system 104 also recommends the identified best suitable portable financial device for completing the payment transaction stage at the merchant's website 108 based on the identification. Further, the computing system 104 outputs the recommended portable financial device on a graphical user interface of the one or more electronic devices 102 associated with the customer.

Figure 2:
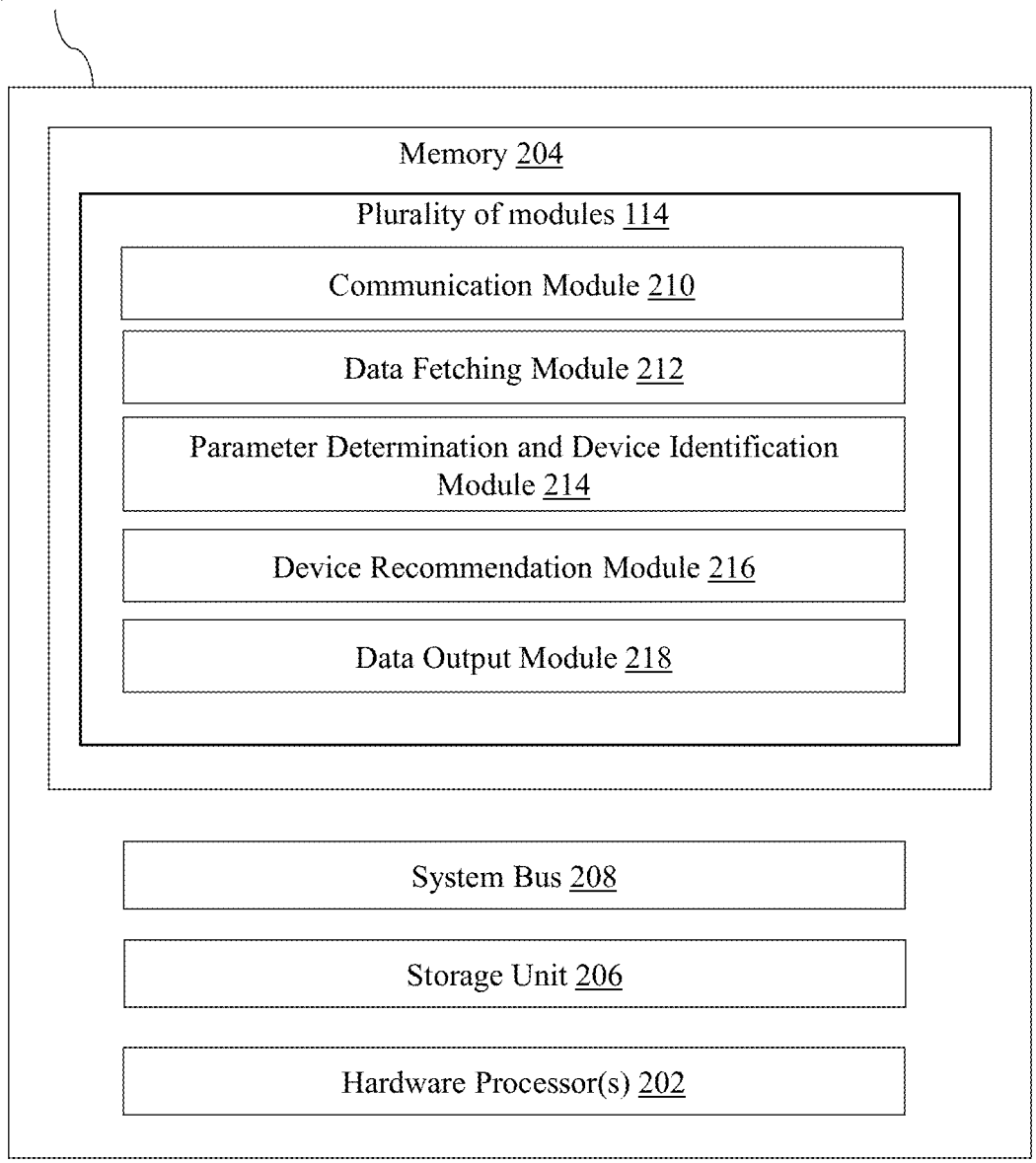
FIG. 2 is a block diagram illustrating an exemplary computing system, such as those shown in FIG. 1, capable of recommending the portable financial device for the payment transaction, in accordance with an embodiment of the present disclosure.

FIG. 2 is a block diagram illustrating an exemplary computing system 104, such as those shown in FIG. 1, capable of recommending a portable financial device for a payment transaction. The computing system 104 comprises one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 114 in the form of programmable instructions executable by the one or more hardware processors 202. Further, the plurality of modules 114 includes a communication module 210, a data fetching module 212, a parameter determination and device identification module 214, a device recommendation module 216 and a data output module 218.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 114 stored in the form of machine-readable instructions on any of the above-mentioned storage media and may be in communication with and executed by the one or more hardware processors 202.

The storage unit 206 may be a cloud storage. The storage unit 206 may store the one or more transactional parameters accessed via the third party's website. The one or more transactional parameters may be accessed by the user via the one or more electronic devices 102. In an embodiment of the present disclosure, the storage unit 206 does not store the data representative of banking accounts.

The communication module 210 is configured to establish a secure communication session with the one or more external APIs 110 during the payment transaction stage at the merchant's website 108. Further, the data fetching module 212 is configured to fetch data representative of banking accounts associated with the customer from the one or more external APIs 110 after establishing the secure communication session. Each banking account include one or more portable financial devices. In an exemplary embodiment of the present disclosure, the one or more portable financial devices include credit cards and debit cards. The data representative of banking accounts associated with the customer include real-time account balance information, past transaction records of the customer, monetary details of the one or more portable financial devices and the like. The monetary details of the one or more portable financial devices include interest rate of each credit card, amount limit of each credit card, annual membership fee, late fee, credit card cash advance fee, maximum payment transaction limit of each portable financial device and the like.

The parameter determination module and device identification module 214 is configured to determine one or more transactional parameters associated with the payment transaction stage at the merchant's website 108 in real-time based on the third-party website 112. The one or more transactional parameters include Personal Identifiable Information (PII) of one or more merchants including Merchant Category Codes (MCC) Merchant Identification Number (MID) of the one or more merchants, reward programs associated with the one or more portable financial devices of the customer, one or more banking account conditions and the like. The PII may be the information used to identify the merchant, such as name and contact information of the patient. In an embodiment of the present disclosure, the one or more merchants may provide the PII associated with them via the computing system 104. The PII received from the one or more merchants is stored in the storage unit 206. Further, the reward programs associated with the one or more portable financial devices of the customer include points, rewards, cashback, miles, discounts or any combination thereof received after performing the payment transaction. The MCC is a unique Identity (ID) assigned to a merchant to categorize type of business owned by the merchant. In an exemplary embodiment of the present disclosure, the type of business include restaurants, gas stations, grocery stores, drug stores, hotels, airlines and the like. Furthermore, the one or more banking account conditions are the conditions set by the customer corresponding to the one or more portable financial devices of the customer. For example, the customer may set credit limit of a particular credit card as one or more banking account conditions.

In an embodiment of the present disclosure, the one or more merchants may add reward programs, such that the customer may gain maximum monetary benefits corresponding to the reward programs added by the one more merchants upon performing the payment transactions. Further, the customer may also receive reward points from the computing system 104 upon completing the payment transaction. The customer may use the reward points to buy gift cards and products via the computing system 104. Thus, the customer gain monetary benefits from issuer of the one or more portable financial devices, one or more merchants and computing system 104 upon performing the payment transaction via the computing system 104.

Further, the parameter determination module and device identification module 214 is configured to generate an optimal score for each of the one or more portable financial devices based on the fetched data representative of banking accounts associated with the customer and the determined one or more transactional parameters by using Machine Learning (ML) based transaction model. In generating the optimal score for each of the one or more portable financial device by using the ML based transaction model, the parameter determination module and device identification module 214 correlates the fetched data representative of the banking accounts with the determined one or more transactional parameters by using the ML based transaction model. In an embodiment of the present disclosure, the parameter determination module and device identification module 214 categorizes the type of business based on the MCC of the merchant while correlating the fetched data representative of banking accounts with the determined one or more transactional parameters to provide maximum monetary benefits to the customer based on the categorized type of business. For example, when the customer may be performing payment transaction at a grocery store, the MCC assigned to the merchant of the grocery store may be used to categorize the type of business owned by the merchant as grocery store. Furthermore, the parameter determination module and device identification module 214 generates the optimal score for each of the one or more portable financial devices based on the correlation of the fetched data representative of banking accounts with the determined one or more transactional parameters.

Furthermore, the parameter determination module and device identification module 214 is configured to identify best suitable portable financial device among the one or more portable financial devices with maximum optimal score. In identifying the best suitable portable financial device among the one or more portable financial device with the maximum optimal score, the parameter and device identification module 214 compares the generated optimal score of the one or more portable financial devices with each other. Further, the parameter determination module and device identification module 214 prioritizes the one or more portable financial devices based on the comparison of the generated optimal score. The parameter determination module and device identification module 214 identifies the best suitable portable financial device among the one or more portable financial device with the maximum optimal score based on highest order of priority of the one or more portable financial devices. In an embodiment of the present disclosure, when the identified best suitable portable financial device may not have sufficient account balance corresponding to the payment transaction, the parameter determination module and device identification module 214 identifies a portable financial device having maximum optimal score and sufficient account balance corresponding to the payment transaction. The customer may also be notified that the best suitable portable financial device is not having sufficient account balance for the payment transaction.

Further, in determining real-time one or more transactional parameters associated with the payment transaction stage at the merchant's website 108 based on real-time third-party website 112, the parameter determination and device identification module 214 is further configured to receive one or more reward maximizer parameters as one of the one or more transactional parameters for the payment transaction from the customer. The one or more reward maximizer parameters is points, rewards, cashback, miles, discounts or any combination thereof offered by the one or more portable financial device. Furthermore, the parameter determination and device identification module 214 is configured to determine best suitable portable financial device among the one or more portable financial devices providing maximum monetary benefits to the customer based on the received one or more maximizer parameters. In an embodiment of the present disclosure, the parameter determination and device identification module 214 determines the best suitable financial device by comparing the reward programs associated with the one or more portable financial devices of the customer based on the received one or more reward maximizer parameters. For example, when the one or more maximizer parameters received from the customer is cashback, the parameter determination and device identification module 214 determines best suitable portable financial device among the one or more portable financial devices providing maximum cashback to the customer. In an embodiment of the present disclosure, when the customer may not provide one or more reward maximizer parameters for the payment transaction, the parameter determination and device identification module 214 determines best suitable portable financial device having best reward program associated with it to provide maximum monetary benefits to the customer. In an embodiment of the present disclosure, the parameter determination and device identification module 214 is configured to determine best suitable portable financial device for each payment transaction of the past transaction records based on the fetched past transaction records of the customer and MCC and MID of the one or more merchants, such that the determined best suitable portable financial device for each payment transaction is recommended to the customer to provide maximize monetary benefits in future. For example, when the past transaction records of the customer shows that the customer has brought groceries by using portable financial devices A and B, the parameter determination and device identification module 214 determines that portable financial device B provides maximum monetary benefit while buying grocery. Further, the customer is recommended to use portable financial device B for buying groceries in future to maximize benefits.

The device recommendation module 216 is configured to recommend the identified best suitable portable financial device for completing the payment transaction stage at the merchant's website 108 based on the identification.

The data output module 218 is configured to output the recommended portable financial device on a graphical user interface of the one or more electronic devices 102 associated with the customer. In an exemplary embodiment of the present disclosure, the data output module 218 may display image of the recommended portable financial device along with its account balance information on the graphical user interface of the one or more electronic devices 102 associated with the customer. When the recommended portable financial device is outputted on the graphical user interface of the one or more electronic devices 102, the customer may use the recommended portable financial device to perform the payment transaction at the merchant's website 108. In an embodiment of the present disclosure, the customer may also select another portable financial device other than the recommended portable financial device to perform the financial transaction. Further, the data output module 218 is configured to output the fetched data representative of banking accounts associated with the customer on the graphical user interface of the one or more electronic devices 102. For example, the data output module 218 outputs subscription amounts and annually/monthly subscriptions on the graphical user interface of the one or more electronic devices 102, such that the customer may manage his bills associated with the one or more portable financial devices in a timely manner to avoid additional fees, such as overdraft fees and over credit limit fees. In an embodiment of the present disclosure, the data output module 218 may also output reward programs associated with the one or more portable financial devices of the customer on the graphical user interface of the one or more electronic devices 102 while outputting the recommended portable financial device.

In an embodiment of the present disclosure, the device recommendation module 216 is also configured to determine if reward programs of other portable financial devices not associated with the customer are better than the reward programs of the one or more financial devices associated with the customer for the payment transaction. Further, the device recommendation module 216 recommends other portable financial devices to the customer upon determining that the reward programs of the other portable financial devices are better than the reward programs of the one or more portable financial devices, such that the user may apply for the other portable financial devices using the computing system 104. In an embodiment of the present disclosure, the reward programs associated with the other portable financial devices are stored in the storage unit 206.

Before using the computing system 104 to receive recommendation for best suitable portable financial device for the payment transaction, the customer is required to add details of the one or more portable financial devices in the computing system 104 via the web application or the mobile application. In an exemplary embodiment of the present disclosure, details of one or more portable financial devices include credit/debit card number, account number, PII of account holder, name of one or more portable financial devices' issuer and the like. When the customer adds details of the one or more portable financial devices in the computing system 104, the computing system 104 fetches data representative of banking accounts associated with the customer and determines one or more transactional parameters associated with the payment transaction stage to recommend best suitable portable financial device to the user based on the fetched data representative of banking accounts and determined one or more transactional parameters. In an embodiment of the present disclosure, the customer may just add name of one or more portable financial devices' issuer, such that the computing system 104 may recommend best suitable portable financial device to the user based on the name of one or more portable financial devices' issuer and determined one or more transactional parameters. In an exemplary embodiment of the present disclosure, the customer may select the name of one or more portable financial devices' issuer from a drop-down menu having names of portable financial devices' issuer. In an embodiment of the present disclosure, when any merchant may not be registered in the computing system 104, the customer may send a request to the merchant to get registered in the computing system 104, such that the customer may perform the payment transaction at the merchant's website 108 using the computing system 104.

Figure 3:
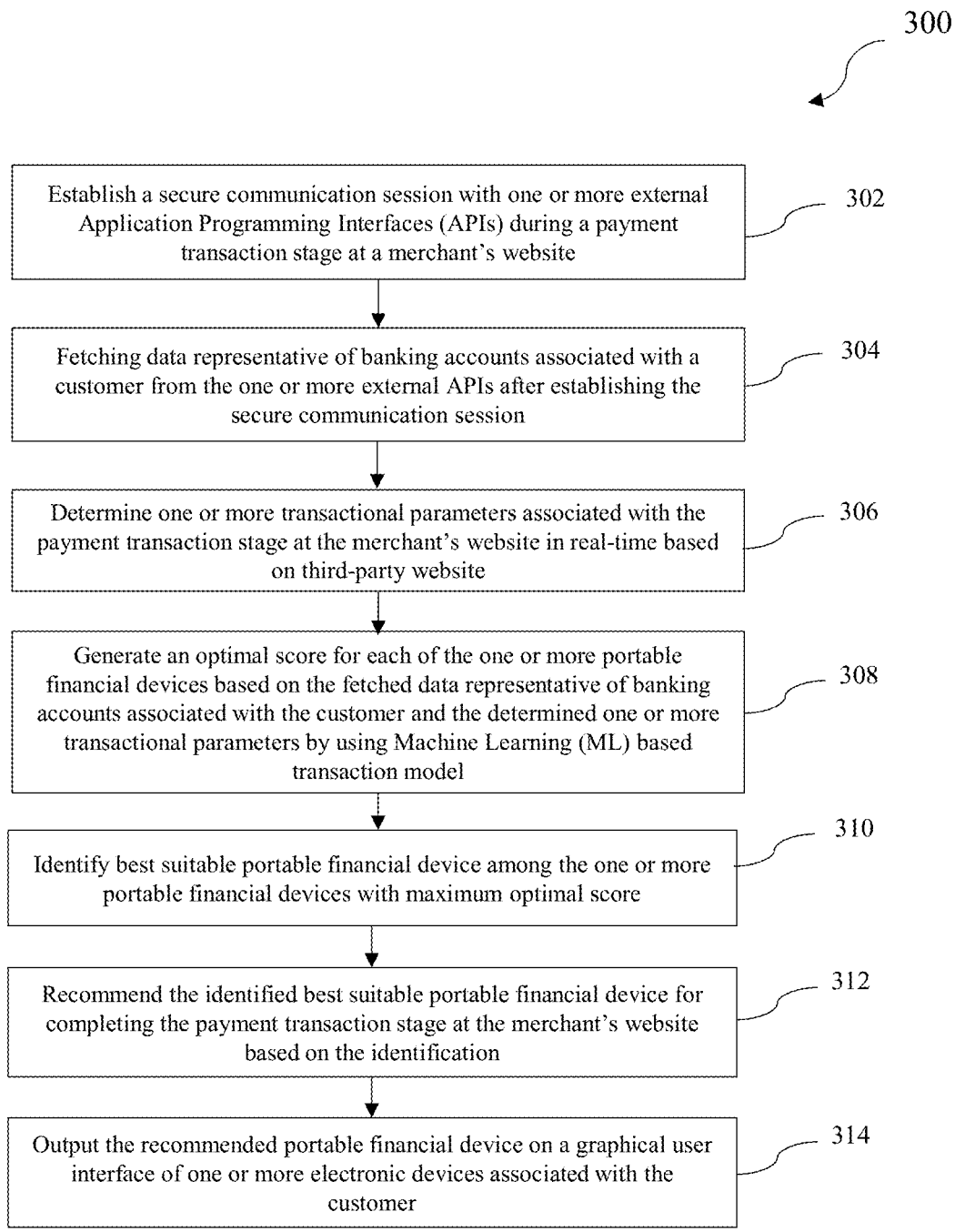
FIG. 3 is a process flow diagram illustrating an exemplary method for recommending the portable financial device for the payment transaction, in accordance with an embodiment of the present disclosure.

FIG. 3 is a process flow diagram illustrating an exemplary method 300 for recommending a portable financial device for a payment transaction in accordance with an embodiment of the present disclosure. At step 302, a secure communication session is established with one or more external Application Programming Interfaces (APIs) 110 during a payment transaction stage at a merchant's website 108. A customer established the secure communication session with the one or more external APIs 110 by using one or more electronic devices 102. In an exemplary embodiment of the present disclosure, the one or more electronic devices 102 may be a laptop computer, desktop computer, tablet computer, smartphone, wearable device and smart watch. At step 304, data representative of banking accounts associated with the customer is fetched from the one or more external APIs 110 after establishing the secure communication session. Each banking account include one or more portable financial devices. In an exemplary embodiment of the present disclosure, the one or more portable financial devices include credit cards and debit cards. The data representative of banking accounts associated with the customer include real-time account balance information, past transaction records of the customer, monetary details of the one or more portable financial devices and the like. The monetary details of the one or more portable financial devices include interest rate of each credit card, amount limit of each credit card, annual membership fee, late fee, credit card cash advance fee, maximum payment transaction limit of each portable financial device and the like.

At step 306, one or more transactional parameters associated with the payment transaction stage at the merchant's website 108 is determined in real-time based on third-party website 112. The one or more transactional parameters include Personal Identifiable Information (PII) of one or more merchants including Merchant Category Codes (MCC) Merchant Identification Number (MID) of the one or more merchants, reward programs associated with the one or more portable financial devices of the customer, one or more banking account conditions and the like. The PII may be the information used to identify the merchant, such as name and contact information of the patient. In an embodiment of the present disclosure, the one or more merchants may provide the PII associated with them. The PII received from the one or more merchants is stored in a storage unit 206. Further, the reward programs associated with the one or more portable financial devices of the customer include points, rewards, cashback, miles, discounts or any combination thereof received after performing the payment transaction. The MCC is a unique Identity (ID) assigned to a merchant to categorize type of business owned by the merchant. In an exemplary embodiment of the present disclosure, the type of business include restaurants, gas stations, grocery stores, drug stores, hotels, airlines and the like. Furthermore, the one or more banking account conditions are the conditions set by the customer corresponding to the one or more portable financial devices of the customer. For example, the customer may set credit limit of a particular credit card as one or more banking account conditions.

At step 308, an optimal score for each of the one or more portable financial devices is generated based on the fetched data representative of banking accounts associated with the customer and the determined one or more transactional parameters by using Machine learning (ML) based transaction model. In generating the optimal score for each of the one or more portable financial device by using ML based transaction model, the method 300 includes correlating the fetched data representative of the banking accounts with the determined one or more transactional parameters by using the ML based transaction model. In an embodiment of the present disclosure, the method 300 categorizes the type of business based on the MCC of the merchant while correlating the fetched data representative of banking accounts with the determined one or more transactional parameters to provide maximum monetary benefits to the customer based on the categorized type of business. For example, when the customer may be performing payment transaction at a grocery store, the MCC assigned to the merchant of the grocery store may be used to categorize the type of business owned by the merchant as grocery store. Furthermore, the method 300 includes generating the optimal score for each of the one or more portable financial devices based on the correlation of the fetched data representative of banking accounts with the determined one or more transactional parameters.

At step 310, best suitable portable financial device among the one or more portable financial devices with maximum optimal score is identified. In identifying the best suitable portable financial device among the one or more portable financial device with the maximum optimal score, the method 300 includes comparing the generated optimal score of the one or more portable financial devices with each other. Further, the method includes prioritizing the one or more portable financial devices based on the comparison of the generated optimal score. The method 300 also includes identifying the best suitable portable financial device among the one or more portable financial device with the maximum optimal score based on highest order of priority of the one or more portable financial devices. In an embodiment of the present disclosure, when the identified best suitable portable financial device may not have sufficient account balance corresponding to the payment transaction, a portable financial device having maximum optimal score and sufficient account balance corresponding to the payment transaction is identified. The customer may also be notified that the best suitable portable financial device is not having sufficient account balance for the payment transaction.

Further, in determining the real-time one or more transactional parameters associated with the payment transaction stage at the merchant's website 108 based on the real-time third-party website 112, the method 300 further includes receiving one or more reward maximizer parameters as one of the one or more transactional parameters for the payment transaction from the customer. The one or more reward maximizer parameters is points, rewards, cashback, miles, discounts or any combination thereof offered by the one or more portable financial device. Furthermore, the method 300 includes determining best suitable portable financial device among the one or more portable financial devices providing maximum monetary benefits to the customer based on the received one or more maximizer parameters. In an embodiment of the present disclosure, the method 300 includes determining the best suitable financial device by comparing the reward programs associated with the one or more portable financial devices of the customer based on the received one or more reward maximizer parameters. In an embodiment of the present disclosure, when the customer may not provide one or more reward maximizer parameters for the payment transaction, the method 300 includes determining best suitable portable financial device having best reward program associated with it to provide maximum monetary benefits to the customer. In an embodiment of the present disclosure, the method 300 includes determining best suitable portable financial device for each payment transaction of the past transaction records based on the fetched past transaction records of the customer and MCC and MID of the one or more merchants, such that the determined best suitable portable financial device for each payment transaction is recommended to the customer to maximize benefit of the customer in future.

At step 312, the identified best suitable portable financial device for completing the payment transaction stage at the merchant's website 108 is recommended based on the identification. At step 314, the recommended portable financial device is outputted on a graphical user interface of the one or more electronic devices 102 associated with the customer. In an exemplary embodiment of the present disclosure, an image of the recommended portable financial device may be displayed on the graphical user interface of the one or more electronic devices 102 associated with the customer. When the recommended portable financial device is outputted on the graphical user interface of the one or more electronic devices 102, the customer may use the recommended portable financial device to perform the payment transaction. In an embodiment of the present disclosure, the customer may also select another portable financial device other than the recommended portable financial device to perform the financial transaction. Further, the fetched data representative of banking accounts associated with the customer may also be outputted on the graphical user interface of the one or more electronic devices 102. In an embodiment of the present disclosure, the reward programs associated with the one or more portable financial devices of the customer may also be outputted on the graphical user interface of the one or more electronic devices 102 while outputting the recommended portable financial device.

In an embodiment of the present disclosure, the method 300 also includes determining if reward programs of other portable financial devices not associated with the customer are better than the reward programs of the one or more financial devices associated with the customer for the payment transaction. Further, the method 300 includes recommending other portable financial devices to the customer upon determining that the reward programs of the other portable financial devices are better than the reward programs of the one or more portable financial devices, such that the user may apply for the other portable financial devices. In an embodiment of the present disclosure, the reward programs associated with the other portable financial devices are stored in the storage unit 206.

In an embodiment of the present disclosure, the customer is required to add details of the one or more portable financial devices via web application or mobile application. In an exemplary embodiment of the present disclosure, details of one or more portable financial devices include credit/debit card number, account number, PII of account holder, name of one or more portable financial devices' issuer and the like. When the customer adds details of the one or more portable financial devices, data representative of banking accounts associated with the customer is fetched and one or more transactional parameters associated with the payment transaction stage is determined to recommend best suitable portable financial device to the user based on the fetched data representative of banking accounts and determined one or more transactional parameters. In an embodiment of the present disclosure, the customer may just add name of one or more portable financial devices' issuer, such that best suitable portable financial device is recommended to the user based on the name of one or more portable financial devices' issuer and determined one or more transactional parameters. In an exemplary embodiment of the present disclosure, the customer may select the name of one or more portable financial devices' issuer from a drop-down menu having names of portable financial devices' issuer.

The method 300 may be implemented in any suitable hardware, software, firmware, or combination thereof.

Figure 4A:
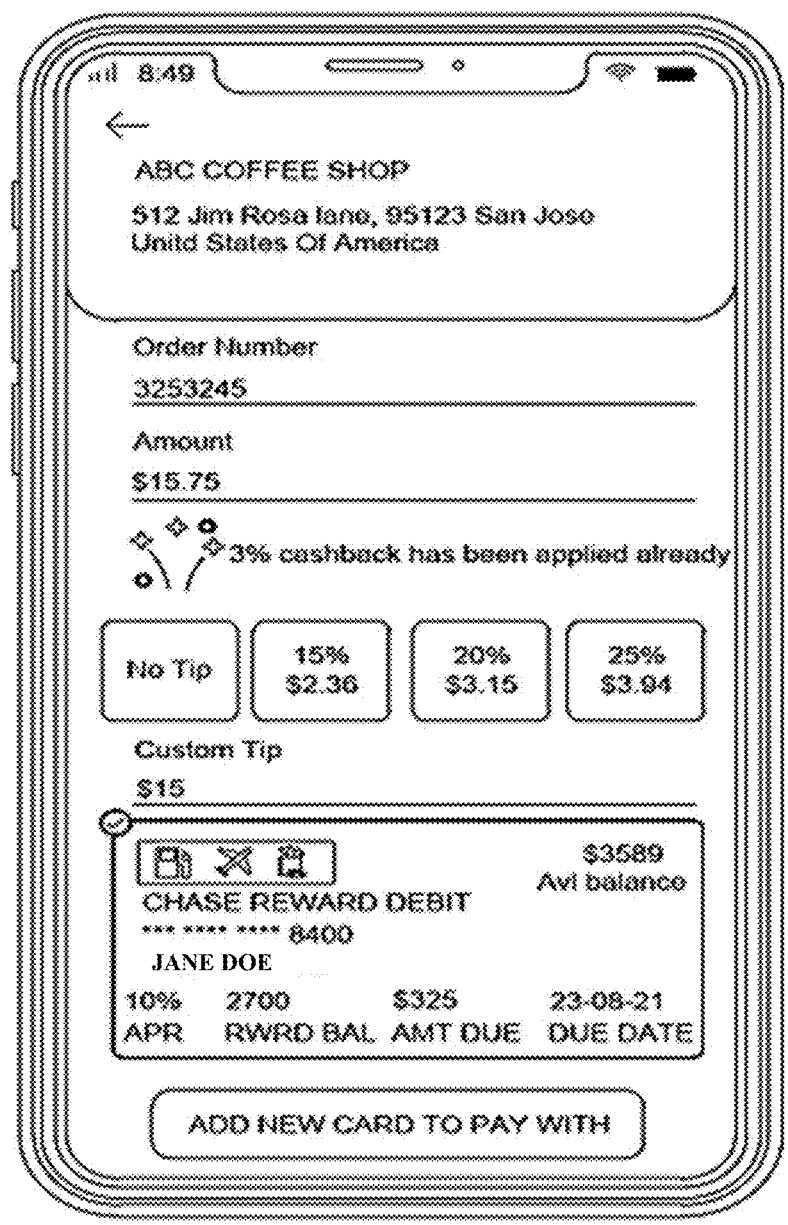
FIG. 4A-B is a graphical user interface screen of a mobile application capable of recommending the portable financial device for the payment transaction, in accordance with an embodiment of the present disclosure.
Figure 4B:
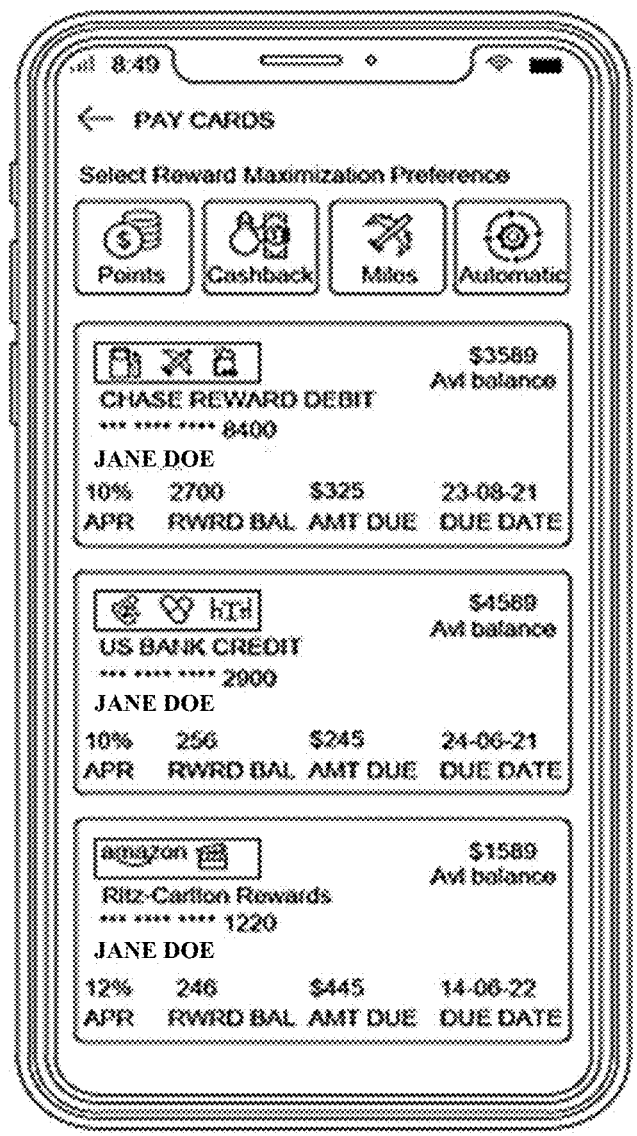

FIG. 4A-B is a graphical user interface screen of a mobile application capable of recommending portable financial device for the payment transaction, in accordance with an embodiment of the present disclosure. FIG. 4A is the graphical user interface screen of the mobile application which is used to recommend portable financial device for the payment transaction, which is earlier explained with respect to FIG. 2. The graphical user interface screen displays name and address of the merchant, order number, amount of the payment transaction, reward program applied for the payment transaction, custom tip and the recommended portable financial device. In the current scenario, the reward program applied for the payment transaction is cashback. Further, the graphical user interface screen also displays account balance of the portable financial device. The customer may easily add another portable financial device by using "add new card to pay with" option on the graphical user interface screen.

FIG. 4B is also the graphical user interface screen of the mobile application which is used to recommend portable financial device for the payment transaction. The graphical user interface screen displays one or more portable financial devices. In the current scenario, three portable financial devices associated with the customer are displayed on the graphical user interface screen, as shown in FIG. 4B. The customer may also select a default portable financial device among the one or more portable financial devices to perform the payment transaction. Portable financial device displayed on top is the recommended portable financial device. In the current scenario, chase reward debit is the recommend portable financial device. Further, the graphical user interface screen also displays one or more reward maximizer parameters for the payment transaction. In the current scenario, the one or more reward maximizer parameters displayed on the graphical user interface screen are pints, cashback, miles and automatic. The customer may also change the one or more reward maximizer parameters for the payment transaction via the graphical user interface screen. In an embodiment of the present disclosure, when the user selects automatic reward maximizer parameter, best suitable portable financial device having best reward program is determined to provide maximum monetary benefits to the customer.

Figure 5A:
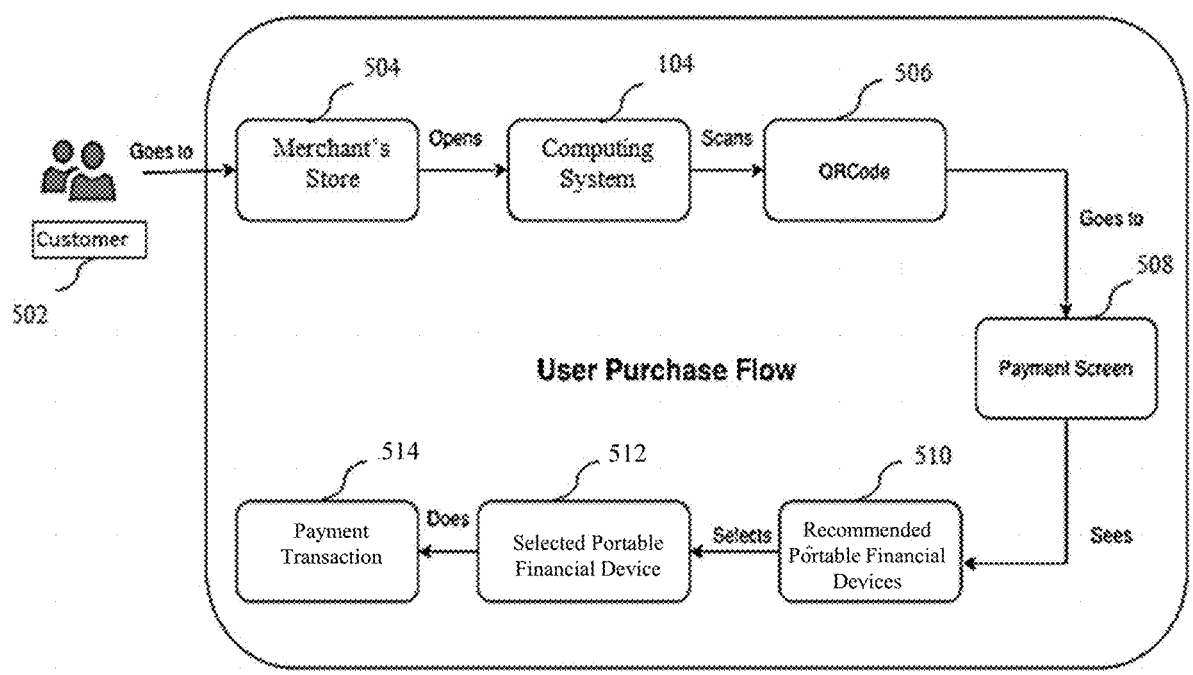
FIG. 5A is a schematic representation for performing the payment transaction, in accordance with an embodiment of the present disclosure.

FIG. 5A is a schematic representation for performing the payment transaction, in accordance with an embodiment of the present disclosure. For performing the payment transaction at the merchant, a customer 502 visits merchant's store 504 or merchant's website 108. In the current scenario, the customer 502 visits the merchant store 504 to perform the payment transaction. Further, the customer 502 uses the computing system 104 to scan a QR code 506 to access payment screen 508 for performing the payment transaction. Furthermore, the customer 502 sees recommended portable financial devices 510 on the payment screen 508. The customer 502 selects desired recommended portable financial device from the recommended portable financial devices 510 to perform the payment transaction. Further, the customer uses the selected portable financial device 512 for performing the payment transaction 514.

Figure 5B:
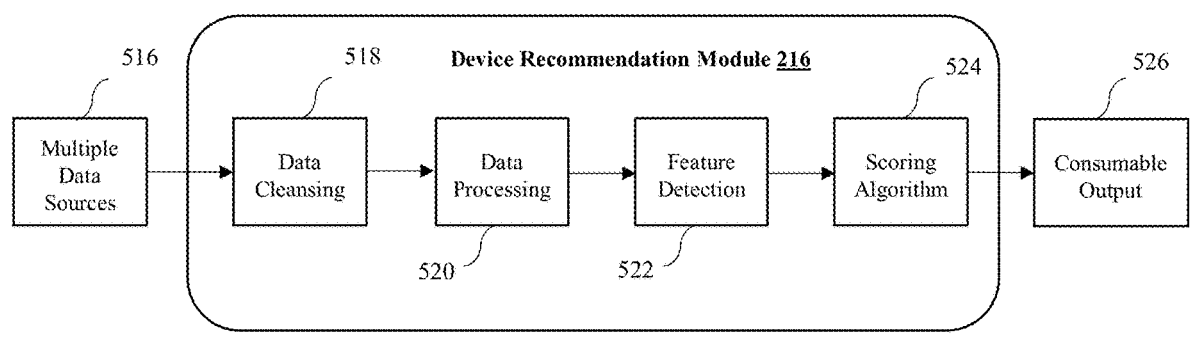
FIG. 5B is a schematic representation for recommending the portable financial device for the payment transaction, in accordance with an embodiment of the present disclosure.

FIG. 5B is a schematic representation for recommending the portable financial device for the payment transaction, in accordance with an embodiment of the present disclosure. In the current scenario, the computing system 104 fetches the data representative of banking accounts and the one or more transactional parameters associated with the payment transaction from multiple data sources 516. In the current scenario, the data source 518 may be the one or more external APIs 110 and the third-party website 112. Further, the computing system 104 performs data cleansing 518 on the fetched data representative of banking accounts and the one or more transactional parameters. Furthermore, the computing system 104 performs data processing 520 on the data representative of banking accounts and the one or more transactional parameters after performing the data cleansing 518. The computing system 104 then performs feature detection 522 on the data representative of banking accounts and the one or more transactional parameters after performing the data processing 520. The computing system 104 then uses a scoring algorithm 524 to generate an optimal score for each of the one or more portable financial devices. The scoring algorithm 524 may be the ML based transaction model. Further, the computing system 104 outputs a consumable output 526 to the customer based on the generated optimal score. The consumable output 526 is the portable financial device providing maximum monetary benefit to the customer for the payment transaction.

Figure 5C:
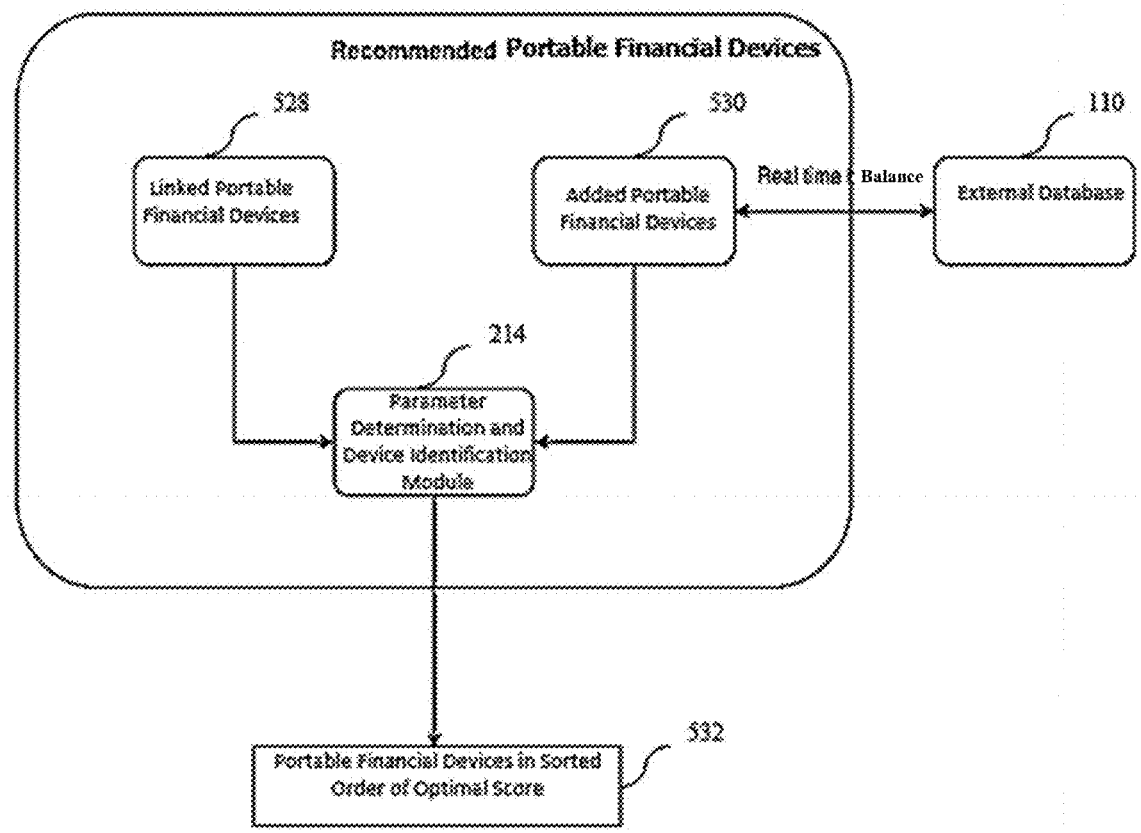
FIG. 5C is a schematic representation for recommending the portable financial device for the payment transaction, in accordance with another embodiment of the present disclosure.

FIG. 5C is a schematic representation for recommending the portable financial device for the payment transaction, in accordance with another embodiment of the present disclosure. In an embodiment of the present invention, the customer may link portable financial devices with the computing system 104 by adding details of the one or more portable financial devices in the computing system 104. The customer may also add portable financial devices to the computing system 104 by just providing name of one or more portable financial devices' issuer. When the customer may link portable financial devices by adding details of the one or more portable financial devices in the computing system 104, the computing system 104 fetches data representative of banking accounts associated with linked portable financial devices 528 including real-time balance information from the one or more external APIs 110. Further, the computing system 104 does not fetch data representative of banking accounts associated with added portable financial devices 530 as only name of one or more portable financial devices' issuer is available for the added portable financial devices 530. Further, the parameter determination and device identification module 214 generates optimal score for the added portable financial devices 530 and the linked portable financial devices 528. Furthermore, the parameter determination and device identification module 214 arrange the portable financial devices in sorted order of optimal score 532.

Thus, various embodiments of the present computing system 104 provide a solution to recommend portable financial device for the payment transaction. Since, the computing system 104 uses real-time data representative of banking accounts associated with the customer to recommend portable financial device for the payment transaction, the computing system 104 is accurate and reliable. Further, the computing system 104 allows the user to provide the one or more reward maximizer parameters for the payment transaction, such that the best suitable portable financial device is determined based on the received one or more maximizer parameters to provide maximum monetary benefits to the customer. The computing system 104 also outputs the fetched data representative of banking accounts associated with the customer on the graphical user interface of the one or more electronic devices 102. Thus, the customer may manage his bills associated with the one or more portable financial devices in timely manner to avoid additional charges. Furthermore, the computing system 104 recommends other portable financial devices to the customer, such that the user may apply for the other portable financial devices using the computing system 104 to gain maximum monetary benefits.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A Machine Learning (ML) based computing system for generating recommendations of a portable financial device for a payment transaction, the Machine Learning (ML) based computing system comprising:
   one or more hardware processors; and
   a memory coupled to the one or more hardware processors, wherein the memory, comprises a plurality of modules in form of programmable instructions executable by the one or more hardware processors, wherein the plurality of modules comprises:
      a communication module configured to establish a secure communication session with one or more external Application Programming Interfaces (APIs) by scanning a Quick Response (QR) code, during a payment transaction stage at a merchant's website, wherein data exchanged after establishing the secure communication session is encrypted;
      a data fetching module configured to fetch data representative of banking accounts associated with a customer from the one or more external APIs after establishing the secure communication session, wherein each banking account comprises one or more portable financial devices, and wherein the data representative of banking accounts associated with the customer comprise: real-time account balance information, past transaction records of the customer and monetary details of the one or more portable financial devices;
      a parameter determination and device identification module configured to:
         determine one or more transactional parameters associated with the payment transaction stage at the merchant's website in real-time based on a third-pally website, wherein the one or more transactional parameters comprise: Personal Identifiable Information (PH) of one or more merchants including Merchant Category Codes (MCC) and Merchant Identification Number (MID) of the one or more merchants, transaction-based points associated with the one or more portable financial devices of the customer and one or more banking account conditions, and wherein the one or more banking account conditions comprises setting of credit limit of the one or more portable financial devices by the customer;
         correlate the fetched data representative of the banking accounts with the determined one or more transactional parameters using a Machine Learning (ML) based transaction model;
         categorize a type of the one or more merchants based on the Merchant Category Codes (MCC) of the one or more merchants during the correlation of the fetched data representative of the banking accounts with the determined one or more transactional parameters;
         determine maximum monetary gain to be provided to each of the one or more portable financial devices associated with the customer, based on the categorized type of the one or more merchants;
         generate an optimal score for each of the one or more portable financial devices based on the determined maximum monetary gain provided to each of the one or more portable financial devices associated with the customer, using the Machine Learning (ML) based transaction model; and
         identify best suitable portable financial device among the one or more portable financial devices with maximum optimal score;
      a device recommendation module configured to generate recommendations of the identified best suitable portable financial device for completing the payment transaction stage at the merchant's website based on the identification; and
      a data output module configured to output the generated recommendations of the portable financial device on a graphical user interface of one or more electronic devices associated with the customer,
   wherein the parameter determination and device identification module further configured to identify a second best suitable financial device among the one or more portable financial devices having a second maximum optimal score and sufficient account balance corresponding to the payment transaction when the best suitable portable financial device having insufficient balance corresponding to the payment transaction, and
   wherein the device recommendation module is configured to:
      determine whether first transaction-based points associated with a third best suitable financial device are optimized than at least one of: second transaction-based points associated with the best suitable portable financial device and third transaction-based points associated with the second best suitable financial device, wherein the third best suitable financial device is not associated with the customer; and
      generate recommendations of the third best suitable financial device on the graphical user interface of the one or more electronic devices associated with the customer for applying for the third best suitable financial device, upon determining that the first transaction-based points associated with the third best suitable financial device are optimized than at least one of: the second transaction-based points associated with the best suitable portable financial device and the third transaction-based points associated with the second best suitable financial device.

2. The ML-based computing system of claim 1, wherein in identifying the best suitable portable financial device among the one or more portable financial devices with the maximum optimal score, the parameter and the device identification module is configured to:
compare the generated optimal score of the one or more portable financial devices each other;
prioritize the one or more portable financial devices based on the comparison of the generated optimal score; and
identify the best suitable portable financial device among the one or more portable financial devices with the maximum optimal score based on highest order of priority of the one or more portable financial devices.

3. The ML-based computing system of claim 1, wherein in determining the real-time one or more transactional parameters associated with the payment transaction stage at the merchant's website based on the third-party website, the parameter determination and the device identification module is further configured to receive one or more transaction-based maximizer parameters as one of the one or more transactional parameters for a payment transaction from the customer.

4. The ML-based computing system of claim 1, wherein the monetary details of the one or more portable financial devices comprise: interest rate of each credit card, amount limit of each credit card, annual membership fee, late fee, credit card cash advance fee and maximum payment transaction limit of each portable financial device.

5. The ML-based computing system of claim 3, wherein the one or more transaction-based maximizer parameters is at least one of: points, cashback, miles and discounts offered by the one or more portable financial devices.

6. A Machine Learning (ML) based method for generating recommendations of a portable financial device for a payment transaction, the Machine Learning (ML) based method comprising:
establishing, by one or more hardware processors, a secure communication session with one or more external Application Programming Interfaces (APIs) by scanning a Quick Response (QR) code, during a payment transaction stage at a merchant's website, wherein data exchanged after establishing the secure communication session is encrypted;
fetching, by the one or more hardware processors, data representative of banking accounts associated with a customer from the one or more external APIs after establishing the secure communication session, wherein each banking account comprises one or more portable financial devices, and wherein the data representative of banking accounts associated with the customer comprise: real-time account balance information, past transaction records of the customer and monetary details of the one or more portable financial devices;
determining, by the one or more hardware processors, one or more transactional parameters associated with the payment transaction stage at the merchant's website in real-time based on a third-party website, wherein the one or more transactional parameters comprise: Personal Identifiable Information (PII) of one or more merchants including Merchant Category Codes (MCC) and Merchant Identification Number (MID) of the one or more merchants, transaction-based points associated with the one or more portable financial devices of the customer and one or more banking account conditions, and wherein the one or more banking account conditions comprises setting of credit limit of the one or more portable financial devices by the customer;
correlating, by the one or more hardware processors, the fetched data representative of the banking accounts with the determined one or more transactional parameters using a Machine Learning (ML) based transaction model;
categorizing, by the one or more hardware processors, a type of the one or more merchants based on the Merchant Category Codes (MCC) of the one or more merchants during the correlation of the fetched data representative of the banking accounts with the determined one or more transactional parameters;
determining, by the one or more hardware processors, maximum monetary gain to be provided to each of the one or more portable financial devices associated with the customer, based on the categorized type of the one or more merchants;
generating, by the one or more hardware processors, an optimal score for each of the one or more portable financial devices based on the determined maximum monetary gain provided to each of the one or more portable financial devices associated with the customer, using the Machine Learning (ML) based transaction model;
identifying, by the one or more hardware processors, best suitable portable financial device among the one or more portable financial devices with maximum optimal score;
generating, by the one or more hardware processors, recommendations of the identified best suitable portable financial device for completing the payment transaction stage at the merchant's website based on the identification;
outputting, by the one or more hardware processors, the generated recommendations of the portable financial device on a graphical user interface of one or more electronic devices associated with the customer;
identifying, by the one or more hardware processors, a second best suitable financial device among the one or more portable financial devices, having a second maximum optimal score and sufficient account balance corresponding to the payment transaction, when the best suitable portable financial device having insufficient balance corresponding to the payment transaction;
determining, by the one or more hardware processors, whether first transaction-based points associated with a third best suitable financial device are optimized than at least one of: second transaction-based points associated with the best suitable portable financial device and third transaction-based points associated with the second best suitable financial device, wherein the third best suitable financial device is not associated with the customer; and
generating, by the one or more hardware processors, recommendations of the third best suitable financial device on the graphical user interface of the one or more electronic devices associated with the customer for applying for the third best suitable financial device, upon determining that the first transaction-based points associated with the third best suitable financial device are optimized than at least one of: the second transaction based points associated with the best suitable portable financial device and the third transaction-based points associated with the second best suitable financial device.

7. The ML-based method of claim 6, wherein identifying the best suitable portable financial device among the one or more portable financial devices with the maximum optimal score comprises:
comparing the generated optimal score of the one or more portable financial devices with each other;
prioritizing the one or more portable financial devices based on the comparison of the generated optimal score; and
identifying the best suitable portable financial device among the one or more portable financial devices with the maximum optimal score based on highest order of priority of the one or more portable financial devices.

8. The ML-based method of claim 6, wherein determining the real-time one or more transactional parameters associated with the payment transaction stage at the merchant's website based on the real-time third-party website further comprises receiving one or more transaction-based maximizer parameters as one of the one or more transactional parameters for a payment transaction from the customer.

9. The ML-based method of claim 6, wherein the monetary details of the one or more portable financial devices comprise: interest rate of each credit card, amount limit of each credit card, annual membership fee, late fee, credit card cash advance fee and maximum payment transaction limit of each portable financial device.

10. The ML-based method of claim 8, wherein the one or more transaction-based maximizer parameters is at least one of: points, cashback, miles and discounts offered by the one or more portable financial devices.

* * * * *